United States Patent [19]

Greenwood

[11] Patent Number: 5,224,724
[45] Date of Patent: Jul. 6, 1993

[54] SCOOTER WITH SIMPLE HARMONIC DRIVE

[76] Inventor: Marvin H. Greenwood, 3444 Wickersham, Houston, Tex. 77027

[21] Appl. No.: 753,969

[22] Filed: Sep. 3, 1991

[51] Int. Cl.⁵ .............................................. B62M 1/00
[52] U.S. Cl. ..................................... 280/221; 280/87.1
[58] Field of Search ....................... 280/220, 221, 87.1, 280/253

[56] References Cited

U.S. PATENT DOCUMENTS

| | | | |
|---|---|---|---|
| 427,110 | 5/1890 | Quevedo | 280/220 X |
| 1,477,544 | 12/1923 | D'Antonio | 280/221 |
| 1,750,187 | 3/1930 | Miller et al. | |
| 2,053,835 | 9/1936 | Kimball et al. | 208/35 |
| 2,251,005 | 7/1941 | Rubinch | 280/258 |
| 2,466,105 | 4/1949 | Hoffman | 280/221 |
| 2,544,996 | 3/1951 | Kander | 280/251 |
| 3,068,795 | 4/1963 | Hatcher et al. | 280/221 |
| 3,992,029 | 11/1976 | Washizawa et al. | 280/221 |
| 4,669,746 | 6/1987 | Wu | 280/221 |

FOREIGN PATENT DOCUMENTS

| | | | |
|---|---|---|---|
| 9295 | 2/1908 | Fed. Rep. of Germany | 280/221 |
| 501552 | 4/1920 | France | 280/221 |
| 297012 | 6/1932 | Italy | 280/221 |

Primary Examiner—Russell D. Stormer
Assistant Examiner—Joseph D. Pape

[57] ABSTRACT

A scooter having a simple harmonic drive including front and rear wheels, a frame connecting the two wheels, a steering mechanism for steering the front wheel, a platform of sufficient size to allow a rider to stand thereon, the platform being mounted to said frame near its forward end and being spring biased at its rear end to be urged upwardly, a driving clutch connected to the rear wheel and to the rear of said platform so that shifting of the center of gravity of the rider fore and aft creates an up-and-down simple harmonic driving movement of the rear of the platform and the driving movement of the scooter. In one form, a spring is mounted on the frame and engages the rear of the platform to urge it upwardly. In modified form, the platform is cantilevered from a bracket secured to the front portion of the frame and is a spring itself so that no separate spring is used to provide the simple harmonic drive.

4 Claims, 3 Drawing Sheets

SCOOTER WITH SIMPLE HARMONIC DRIVE

BACKGROUND

A scooter which is a two or three wheel vehicle having a steerable front wheel and a platform extending between the front and rear wheels on which one or both feet of the rider may be placed as the device is ridden, usually powered by the rider pushing with one foot. In the progression of the scooter type of device there have been many variations in structure, particularly in the way in which the device is to be powered by the rider.

An early example of this is disclosed in U.S. Pat. No. 1,750,187 wherein the scooter is powered by a beam mounted by a pivot from the platform between the wheels and having a link with a slot connecting to the rear wheel which has a ratchet drive that is driven by the movement of the link. The device is designed specifically to allow the operator to apply power or coast as desired.

Another type of power device for a scooter is shown in U.S. Pat. No. 2,053,835 wherein a pedal which is pushed down by the rider and has a spring return provides the motive power through a connection to a pivoting arm which engages a drive chain that is mounted to the rear wheel so that the forward movement rotates the rear wheel and the recovery or return movement caused by the spring does not interfere with the rotation of the rear wheel.

Another pedal operated scooter is shown in U.S. Pat. No. 2,251,005 wherein pedal movement in one direction causes rotation of a pulley which is connected by a chain drive to the rear wheel.

U.S. Pat. No. 2,466,105 discloses a treadle operated scooter in which the treadle through a series of cranks and links rotates a sprocket which is connected by a chain to a sprocket on the rear axle. A clutch allows the free movement in the non-driving direction while the treadle is returning to its upper position responsive to force of the riders forwardly positioned foot, with the rearward positioned foot being responsible for the driving movement of the treadle.

U.S. Pat. No. 2,544,996 discloses a scooter which has a treadle operated rear wheel with an overrunning clutch with the driving power being obtained by pushing on the pedal and the pedal is returned by a spring loading of the chain which connects the pedal to the rear wheel through an overrunning clutch.

U.S. Pat. No. 3,992,029 discloses another scooter device having a pedal which is pushed by the rider and connects to a flexible member (chain) which drives one of the three wheels and is returned by a spring.

Another more recent scooter device is disclosed in U.S. Pat. No. 4,124,222 in which a rockable platform is mounted thereon and its movement is translated to the rear wheel by a crank arm and chain to a sprocket on the rear wheel. The end of the chain is connected to a spring to return the chain and platform to their position ready for the application of the weight of the rider to the forward position of the platform.

SUMMARY

The present invention relates to an improved scooter device which provides an improved drive that utilizes the riders weight to provide part of a simple harmonic variable drive The device includes a steerable front wheel, a mechanically driven rear wheel, a frame connecting the front and rear wheels and providing a horizontal pivot for a rocking platform upon which the rider can stand, a spring suitably connected to the rocking platform, means connecting the rocking platform to the rear wheel to provide the driving thereof and a set of handle bars with which the rider can pull himself forward or push himself aft moving his weight fore and aft, thus changing the force pushing down on the spring, and changing the natural frequency of the driving force to that of the speed of the driving wheel.

An object of the present invention is to provide an improved scooter having an improved driving means which allows the speed for simple harmonic motion to be changed by merely shifting the rider's weight fore and aft.

Another object is to provide an improved scooter that can be operated with a minimum amount of energy.

BRIEF DESCRIPTION OF THE DRAWINGS

These and other objects and advantages are hereinafter set forth and explained with respect to the drawings wherein.

DESCRIPTION OF THE PREFERRED EMBODIMENT

Figure 2:
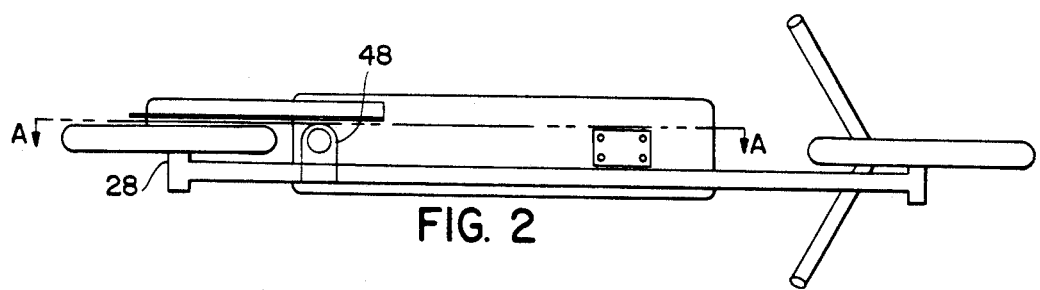
FIG. 2 is a view of the device shown in FIG. 1 taken from below
Figure 3:
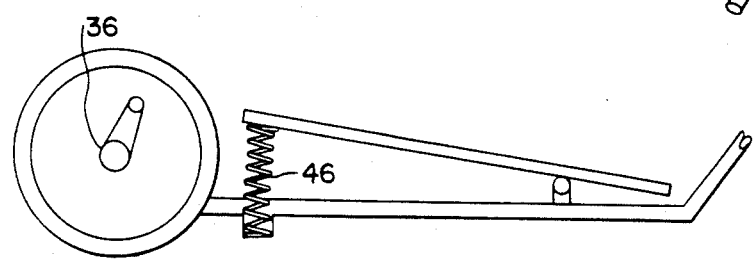
FIG. 3 is another elevation view taken along line A—A in FIG. 2 to show the positioning of the spring
Figure 1:
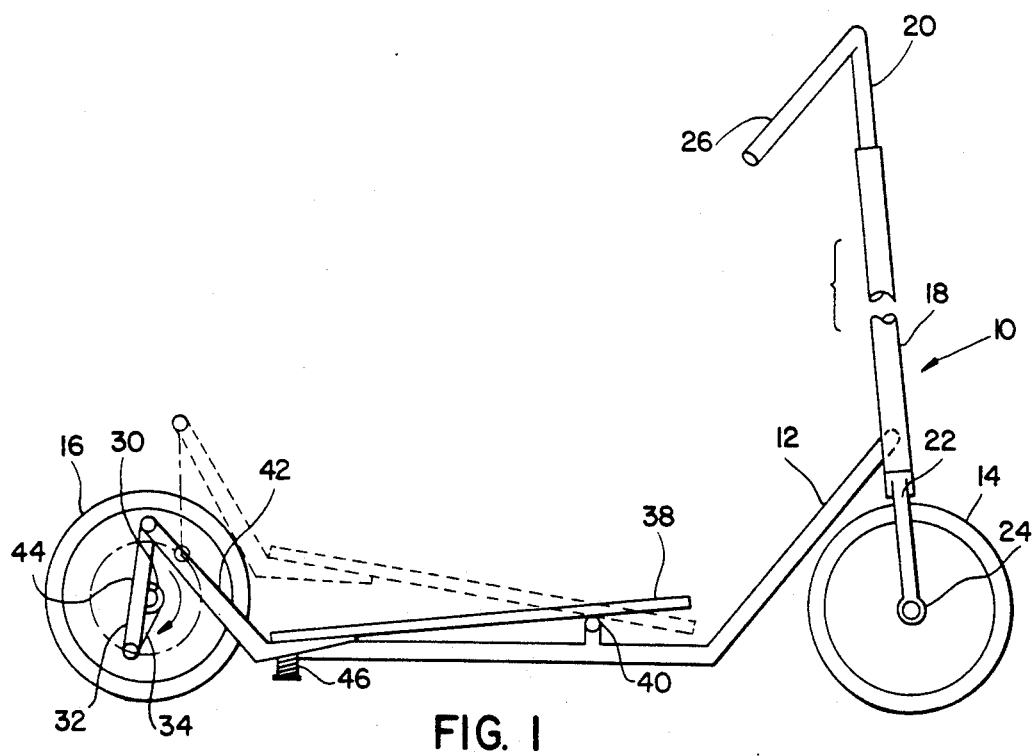
FIG. 1 is a side elevation view of the improved device of the present invention.

Scooter 10 includes frame 12 which connects between front wheel 14 and rear wheel 16 as shown. The forward end of frame 12 connects to sleeve 18 which surrounds steering shaft 20 which is supported from fork 22. Axle 24 of front wheel 14 extends through the two ends of fork 22 so that wheel 14 supports the front end of frame 12 and is steerable by movement of handle bars 26 which are secured to the upper end of steering shaft 20. The rear end of frame 12 includes bearing cup 28 which supports axle 30 of rear wheel 16. Bearing cup 28 is on the left side of scooter 10 and the right side of axle 30 is connected to radial arm 32 which is connected to rear wheel 16 by a one way clutch 34 which is engaged when the scooter 10 is being driven and is disengaged when the scooter 10 is coasting.

The drive mechanism includes platform 38 which is pivotally mounted by pin 40, platform extension 42 and connecting rod 44. Pivoting movement of platform 38 is translated by platform extension 42 and connecting rod 44 into a rotation of the radial arm 32 which through the clutch 34 causes the rotation of the wheel in a forward direction. Spring 46 is positioned under the rear end of platform 38 and is supported from frame by plate 48. Spring thus edges rear end of platform 38 upwardly.

Figure 4:
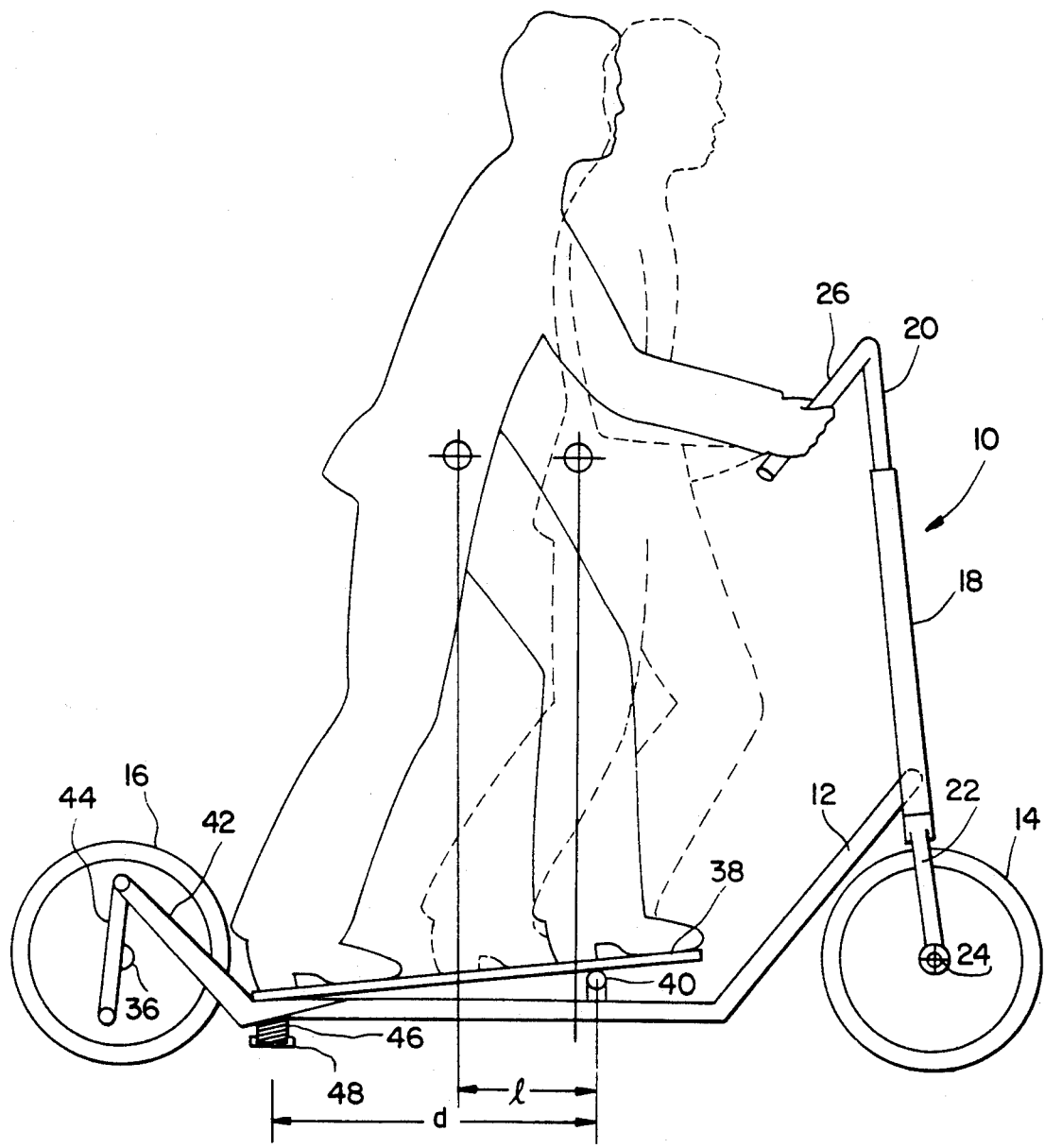
FIG. 4 is composite elevation view of the improved scooter of the present invention being ridden with the rider's positions being shown in solid and dashed lines as hereinafter explained.

In the use of the improved scooter of the present invention, the rider will stand on platform 38 with one foot on the forward end and the other foot on the rear end of the platform as shown in FIG. 4. By shifting the rider's weight to the rear to the position shown in the solid lines, the rider's center of gravity will shift to the rear and a force will be applied to the rear of platform 38 causing such rear end to move downward. The force of spring 46 builds as the rear end of platform 38 moves downward until it reaches a maximum at the bottom dead center position of the crank when will stop and the force of spring will cause an upward movement of platform 38. The up and down movement of platform 38 is translated to a rotational force applied to rear wheel 16 so that scooter 10 moves forward. The shifting of the rider's center of gravity fore and aft position can be accomplished without moving the position of the rider's feet on platform 38. This shifting is readily accomplished by the rider pushing or pulling on handle bars 26. The effect of this change in the fore and aft center of gravity position on the oscillating period of the scooter is readily calculated from the following formula:

$$T = 2\pi \sqrt{\frac{m}{k}} \text{ where } T = \text{time (sec's)}.$$

m = mass (wt in lbs/32.2) and k = apparent spring constant (lbs/inch) K × l/d where K = actual spring constant, d = the horizontal distance between the pivot and spring and l = the horizontal distance between the pivot and the rider's center of gravity, as shown on FIG. 4.

To continue going forward the rider will continue to thrust the spring down and let it return. To increase the speed, the rider will thrust down more frequently. This requires a certain amount of energy. This energy is minimized when the natural frequency of the (spring rate—rider's weight is in simple harmonic resonance with the rate of rotation of the driving wheel. As rate of rotation of the driving wheel continues to change it is desirable to change the apparent spring rate of the system by shifting the weight of the rider fore or aft. To go faster the rider must pull his weight forward.

Figure 5:
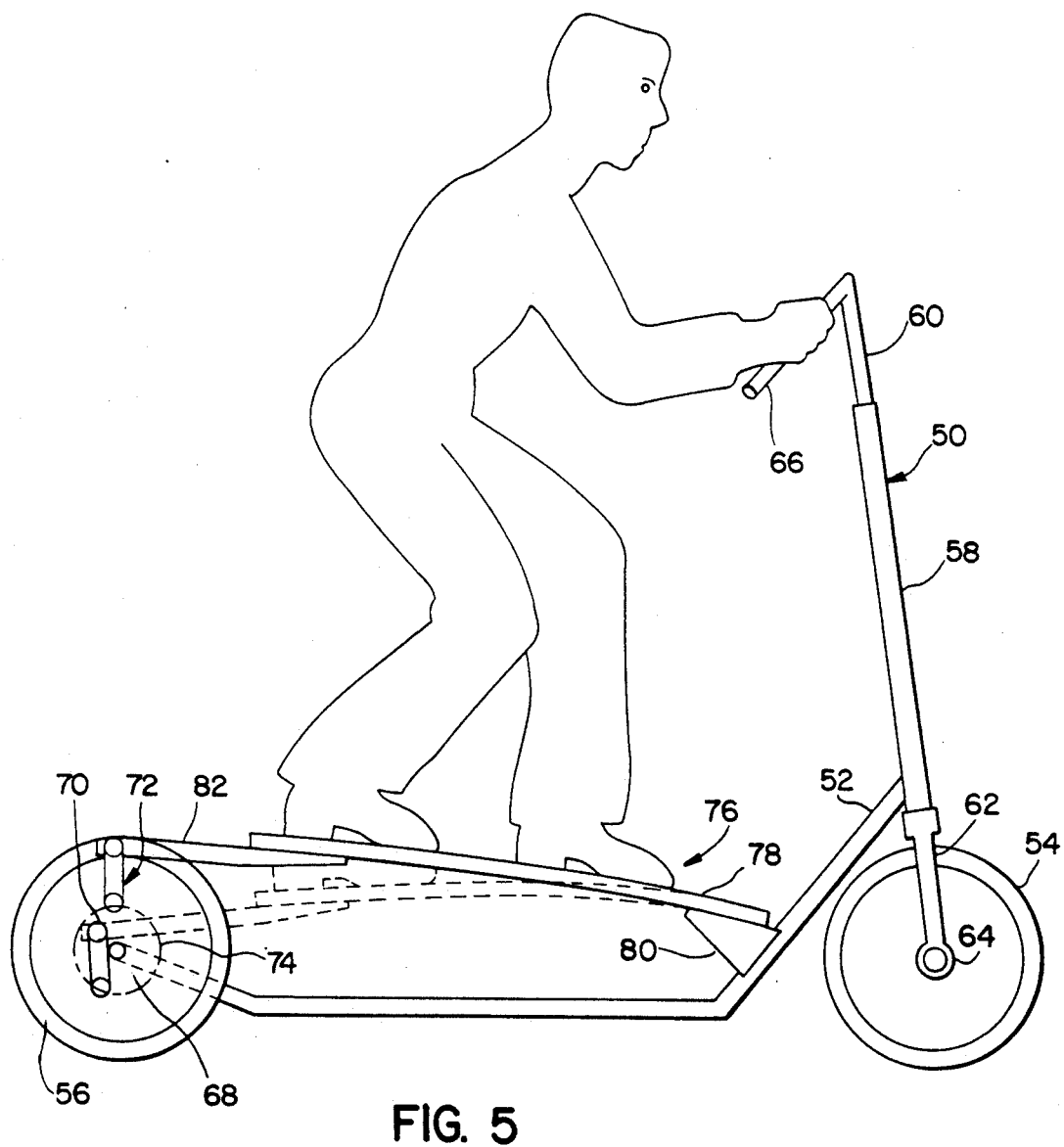
FIG. 5 is a side elevation view of a modified form of the scooter of the present invention.

A modified form of the present invention is illustrated in FIG. 5 wherein, scooter 50 includes frame 52 which connects between front wheel 54 and rear wheel 56 as shown. The forward end of frame 52 connects to sleeve 58 which surrounds steering shaft 60 which is supported from fork 62. Axle 64 of front wheel 54 extends through the two ends of fork 62 so that wheel 54 supports the front end of frame 52 and is steerable by movement of handle bars 66 which are secured to the upper end of steering shaft 60. The rear end of frame 52 includes bearing cup 68 which supports axle 70 of rear wheel 56. Bearing cup 68 is on the left side of scooter 50 and the right side of axle 70 is connected to radial arm 72 which is connected to rear wheel 56 by a one way clutch 74 which is engaged when the scooter 50 is being driven and is disengaged when the scooter 50 is coasting.

The drive mechanism 76 includes spring platform 78 which is cantilever supported from bracket 80 that is secured to frame 52 at its forward end and its rear extension 82 is connected to radial arm 72. Platform 78 functions in a manner previously described with respect to platform 28 on scooter 10 except that it does not pivot but acts as its own spring. The relationship of the driving and coasting by the rider on scooter 50 are substantially identical with that described with respect scooter 10.

In both scooters they provide an improved driving means which allows the speed for simple harmonic motion to be changed by merely shifting the rider's weight fore and aft.

What is claimed is:

1. A scooter comprising
a front wheel having an axle,
a rear wheel having an axle and a clutch mechanism connected to drive said rear wheel,
a frame,
means connecting the frame to said rear wheel axle and said front wheel axle so that the frame provides a connection between said front and rear wheels,
means interposed between said frame and said front wheel axle for steering movement of the front wheel,
a platform having a forward end and a rear end and being supported from said frame near its forward end above said frame for up and down movement of the rear end of said platform,
means providing a driving connection between said platform and said clutch so that the up and down movement of the rear end of the platform is transmitted into rotation of the rear wheel in the direction to cause forward movement of said scooter, and
resilient means urging the rear end of said platform upward permitting the rider to shift the position of his center of gravity fore or aft to create a simple harmonic driving movement of the scooter.

2. A scooter comprising
a front wheel having an axle,
a rear wheel having an axle and a clutch mechanism connected to drive said rear wheel,
a frame,
means connecting the frame to said rear wheel axle and said front wheel axle so that the frame provides a connection between said front and rear wheels,
means interposed between said frame and said front wheel axle for steering movement of the front wheel,
a platform having a forward end and a rear end and being supported from said frame near its forward end above said frame for up and down movement of a rider with respect to the rear end of said platform,
means providing a driving connection between said platform and said clutch so that the up and down movement of the rear end of the platform is transmitted into rotation of the rear wheel in the direction to cause forward movement of said scooter,
resilient means urging the rear end of said platform upward permitting the rider to shift the position of his center of gravity fore or aft to create a simple harmonic driving movement of the scooter, and wherein
said platform is a spring which urges the rear end of the platform upwardly with respect to said frame and against the weight of the rider and has its forward end cantilevered from the forward part of the frame.

3. A scooter according to claim 2 wherein the fore and aft movement of the rider's center of gravity causes the weight of the rider of the scooter on the platform to coact with the spring of the platform to provide a simple harmonic motion to the driving of the scooter.

4. A scooter according to claim 1 wherein said driving connection means includes
a crank connected to rotate the rear wheel, and
a connection between the rear of the platform and the crank to cause said crank to rotate as the rear of the platform is moved up and down.

* * * * *